(12) United States Patent
Kurokawa et al.

(10) Patent No.: US 9,389,627 B2
(45) Date of Patent: Jul. 12, 2016

(54) CONTROL CIRCUIT AND CONTROL METHOD FOR INHIBIT OVERSHOOT AND UNDERSHOOT IN POWER CONVERSION DEVICE

(75) Inventors: Fujio Kurokawa, Nagasaki (JP); Hiroyuki Osuga, Tokyo (JP)

(73) Assignees: NAGASAKI UNIVERSITY, NATIONAL UNIVERSITY CORPORATION, Nagasaki-Shi, Nagasaki (JP); MITSUBISHI ELECTRIC CORPORATION, Tokyo (JP)

( * ) Notice: Subject to any disclaimer, the term of this patent is extended or adjusted under 35 U.S.C. 154(b) by 475 days.

(21) Appl. No.: 13/576,379

(22) PCT Filed: Jan. 31, 2011

(86) PCT No.: PCT/JP2011/051971
§ 371 (c)(1),
(2), (4) Date: Jan. 17, 2013

(87) PCT Pub. No.: WO2011/093500
PCT Pub. Date: Aug. 4, 2011

(65) Prior Publication Data
US 2013/0106383 A1   May 2, 2013

(30) Foreign Application Priority Data

Jan. 31, 2010   (JP) .................................. 2010-019833

(51) Int. Cl.
*G05F 1/00*     (2006.01)
*G05F 1/618*    (2006.01)
*H02M 3/156*    (2006.01)
(52) U.S. Cl.
CPC ............... *G05F 1/618* (2013.01); *H02M 3/156* (2013.01); *H02M 2003/1566* (2013.01)

(58) Field of Classification Search
CPC ..... H02M 3/156; H02M 3/157; H02M 7/062; H02M 7/125
USPC ...................... 323/282, 283; 363/21.05, 21.13
See application file for complete search history.

(56) References Cited

U.S. PATENT DOCUMENTS 5,909,370 A  *  6/1999  Lynch .................... G05B 5/01
                                                       700/28

(Continued)

FOREIGN PATENT DOCUMENTS

| JP | 63-174563 | 7/1988 |
| JP | 2005-130616 | 5/2005 |
| JP | 2005-198484 | 7/2005 |

*Primary Examiner* — Adolf Berhane
*Assistant Examiner* — Alex Torres-Rivera
(74) *Attorney, Agent, or Firm* — Kile Park Reed & Houtteman PLLC

(57) ABSTRACT

By adding a suppression amount for suppressing an overshoot or undershoot that attenuates with time during an overshoot or undershoot period, the overshoot or undershoot can be suppressed within a short time and the output can be made close to a normal value. When an output has overshot, an overshoot suppression amount including a time-dependent attenuation suppression amount is added to an output feedback control amount, the time-dependent attenuation suppression amount being defined in a period during which the output overshoots. Alternatively, when the output has undershot, an undershoot suppression amount including a time-dependent attenuation suppression amount is added to the output feedback control amount, the time-dependent attenuation suppression amount being defined in a period during which the output undershoots.

12 Claims, 14 Drawing Sheets

(56) References Cited

U.S. PATENT DOCUMENTS

| | | | |
|---|---|---|---|
| 7,489,119 B2 * | 2/2009 | Smith, Jr. | H02M 3/157 323/283 |
| 2002/0180410 A1 * | 12/2002 | Brooks | H02M 3/1584 323/282 |
| 2008/0054865 A1 * | 3/2008 | You | H02M 3/156 323/271 |
| 2008/0231247 A1 * | 9/2008 | Uehara | H02M 3/158 323/284 |
| 2008/0252280 A1 * | 10/2008 | Prodic | H02M 3/157 323/283 |

* cited by examiner (A)

(B)

(A)

(B)

(C)

(A)

(B)

(A)

(B)

(C)

CONTROL CIRCUIT AND CONTROL METHOD FOR INHIBIT OVERSHOOT AND UNDERSHOOT IN POWER CONVERSION DEVICE

FIELD OF THE INVENTION

The present invention relates to a control circuit and control method for power conversion device which can inhibit overshoots (or undershoots) within a short time. In period when overshoot (or undershoot) occurs, timewise decrement quantity to inhibit the overshoot (or undershoot) is used for control.

BACKGROUND ART

An output voltage value or an output current value may oscillate when the state of system suddenly changed in a power conversion system. Operation may be stopped until influence of oscillation disappears in a power conversion system without control. In a typical power conversion system, feedback control is performed to obtain stable output. For example, in a power converter of digital control type, power conversion control is performed by adjusting ON-time of a control switch. A control system of a switching power supply (90) of FIG. 13(A) consists of a control circuit (91) and a drive circuit (92). The control circuit (91) inputs values of output voltage ($e_o$) and output current ($i_o$) of the switching power supply (90). The control circuit (91) sends a timing signal for ON-OFF switching of a transistor switch ($T_r$) to the drive circuit (92) as shown in FIG. 13(B). The drive circuit (92) operates the transistor switch ($T_r$) based on the timing signal. The timing signal of the transistor switch ($T_r$) is as shown in FIG. 13(B).

The output voltage ($e_o$) may greatly change during operation not only in startup. The control circuit (91) usually performs PID control, so when the output voltage ($e_o$) converges to the desired value, overshoot or undershoot appears in the output voltage ($e_o$).

The output voltage ($e_o$) may change small as shown in FIG. 14(B). In this case however, when output voltage ($e_o$) returns to the desired value, overshoot and undershoot also appears in output voltage ($e_o$). On the other hand, output voltage ($e_o$) may have very slow transient response when overshoot and undershoot do not appear as shown in FIG. 14(C).

In a power supply circuit used for driving a microprocessor, it is necessary that these overshoot and undershoot should be small and the output voltage ($e_o$) must converge to the desired value within a short time.

PRIOR ART DOCUMENTS

A Patent Document

PATENT DOCUMENT 1: JP2005-198484

SUMMARY OF THE INVENTION

A Problem to be Solved by the Invention

Conventionally, as shown in a patent document 1, a control method for inhibiting outbreak of overshoot is known. The control is performed by a series regulator connected to switching type DC-DC converter in parallel. However, problems of the control method are that circuit structure and control method are complicated. Therefore, a cost of manufacture becomes higher, and the size of the control circuit becomes large.

An object of the present invention is to inhibit overshoot (undershoot) within a short time by a timewise decrement inhibited variable of the overshoot (undershoot) in a period when the overshoot (undershoot) occurs.

A Means for Solving Problem

Subject matter of control circuit for inhibiting overshoot and undershoot in a power conversion device of the present invention is (1)-(8).

(1)

A control circuit for inhibiting overshoot and undershoot in a power conversion device comprising:

an overshoot/undershoot detecting portion which detects overshoot or undershoot; and an overshoot/undershoot inhibited variable generator which generates overshoot inhibited variable or undershoot inhibited variable, wherein at a time when the overshoot/undershoot detecting portion detects overshoot, the overshoot/undershoot inhibited variable generator generates the overshoot inhibited variable including timewise decrement inhibited variable which works at least in beginning of one overshoot period, at a time when the overshoot/undershoot detecting portion detects undershoot, the overshoot/undershoot inhibited variable generator generates the undershoot inhibited variable including timewise decrement inhibited variable which works at least in beginning of one undershoot period, and the timewise decrement inhibited variable is determined by a monotone decreasing function of which amplitude damps timewise.

For example, a control circuit for inhibiting overshoot and undershoot in a power conversion device of the present invention is used in restraint of response due to output variation. The timewise decrement inhibited variable included in the overshoot inhibited variable may work in almost all period of one overshoot or it may work in a part of one overshoot period.

Also, the timewise decrement inhibit variable included in the undershoot inhibited variable may work in almost all period of one undershoot or it may work in a part of one overshoot period. The part of one overshoot period includes short period of beginning of the one overshoot and the part of one undershoot period includes short period of beginning of the one undershoot.

In a power conversion device, PID control is performed when overshoot does not occur. When an overshoot occurs, for example, an overshoot inhibited variable including timewise decrement inhibited variable is added to PID control variable. When undershoot occurs, an undershoot inhibited variable including timewise decrement inhibited variable is also added to PID control variable. Overshoot and undershoot are inhibited in a short time by above mentioned process. Further, an undershoot appearing after the overshoot is inhibited immediately and an overshoot appearing after the undershoot is inhibited immediately.

When overshoots and undershoots are repeated, overshoot inhibited variable and undershoot inhibited variable are added to PID control variable at least two times sequentially.

(2)

The control circuit for inhibiting overshoot and undershoot in the power conversion device according to (1), wherein the overshoot inhibited variable includes the timewise decrement inhibited variable only in a first overshoot, or only in overshoots and undershoots of earlier M times, wherein M is an integer number larger than 2, or the undershoot inhibited variable includes the timewise decrement inhibited variable only in a first undershoot, or only in undershoots and overshoots of earlier M times, wherein M is an integer number larger than 2.

According to the present invention, overshoot inhibited variable includes timewise decrement inhibited variable in a first overshot. However, if inhibition of subsequent undershoot and overshoot is insufficient, overshoot inhibited variable can include timewise decrement inhibited variable in the subsequent undershoot and overshoot.

(3)

The control circuit for inhibiting overshoot and undershoot in the power conversion device according to (1), which performs feedback control of output of the power conversion device, wherein said control circuit comprises:
a feedback circuit which generates feedback control signal so that the output nears reference value, and
a control signal addition portion which outputs addition control signal which is a sum of the feedback control signal and the overshoot inhibited variable or the undershoot inhibited variable.

(4)

The control circuit for inhibiting overshoot and undershoot in the power conversion device according to (1), which generates a control signal of a power switch of the power conversion device, wherein the overshoot/undershoot inhibited variable generator generates the overshoot inhibited variable or the undershoot inhibited variable by attenuating switch-ON-time value or switch-OFF-time value of the control signal with passage of sampling time.

(5)

The control circuit for inhibiting overshoot and undershoot in the conversion device according to (3), which regulates ON-time of a power switch of the power conversion device, wherein $T_{ON,n}$, which is the ON-time of the power switch, is a sum of a time based on the feedback control signal and a time based on the overshoot inhibited variable or the undershoot inhibited variable, $$T_{ON,n} = T_{FB,n} + T_{OU,n}$$

$T_{ON,n}$: ON-time of the power switch
$T_{FB,n}$: time based on the feedback control signal
$T_{OU,n}$: time based on undershoot or overshoot inhibited variable $$T_{OU,n} = T_{BIAS} + k_{c2} \cdot \Delta i_o \cdot \exp(-k_{c1} \cdot n) + k_{v2} \cdot \Delta e_o \cdot \exp(-k_{v1} \cdot n)$$

$T_{BIAS}$: fixed time
$\Delta i_o$: variation of output current
$\Delta e_o$: variation of output voltage
$k_{c1}, k_{c2}, k_{v1}, k_{v2}$: constant
n: numeric value of sampling number (6)

The control circuit for inhibiting overshoot and undershoot in the power conversion device according to (1), wherein input of the control circuit is an output voltage, an output current or an output power.

(7)

The control circuit for inhibiting overshoot and undershoot in the power conversion device according to (1), wherein the overshoot inhibited variable or the undershoot inhibited variable is generated from at least one among an input voltage, an output voltage, an output current, an output power, a current flowing through a power switch, a current flowing through a reactor provide in output side of the power conversion device and a current flowing through a capacitor provide in output side of the power conversion device.

(8)

The control circuit for inhibiting overshoot and undershoot in the power conversion device according to claim 1, wherein the monotone decreasing function of which amplitude damps timewise is an exponential function or a staircase function.

Subject matter of control method for inhibiting overshoot and undershoot in a power conversion device of the present invention is (10)-(14).

(10)

A control method for inhibiting overshoot and undershoot in a power conversion device comprising:
detecting overshoot or undershoot; and
generating overshoot inhibited variable or undershoot inhibited variable,
wherein
at a time when detecting overshoot, generating the overshoot inhibited variable including timewise decrement inhibited variable which works at least in beginning of one overshoot period,
at a time when detecting undershoot, generating the undershoot inhibited variable including timewise decrement inhibited variable which works at least in beginning of one undershoot period, and
the timewise decrement inhibited variable is determined by a monotone decreasing function of which amplitude damps timewise.

For example, the control method for inhibiting overshoot and undershoot in a power conversion device of the present invention is used for inhibiting a response due to the output variation. In the control method of power conversion device of the present invention, when overshoots and undershoots are repeated, overshoot inhibited variable and undershoot inhibited variable are added to feedback controlled signal at least two times sequentially.

(11)

The control method for inhibiting overshoot and undershoot in the power conversion device according to (10), wherein
the overshoot inhibited variable includes the timewise decrement inhibited variable only in a first overshoot, or only in overshoots and undershoots of earlier M times, wherein M is an integer number larger than 2, or
the undershoot inhibited variable includes the timewise decrement inhibited variable only in a first undershoot, or only in undershoots and overshoots of earlier M times, wherein M is an integer number larger than 2.

(13)

The control method for inhibiting overshoot and undershoot in the power conversion device according to (10), wherein the overshoot inhibited variable or the undershoot inhibited variable is generated from at least one among an input voltage, an output voltage, an output current, an output power, a current flowing through a power switch, a current flowing through a reactor provide in output side of the power conversion device and a current flowing through a capacitor provide in output side of the power conversion device.

(14)

The control method for inhibiting overshoot and undershoot in the power conversion device according to claim 10, wherein the monotone decreasing function of which amplitude damps timewise is an exponential function or a staircase function.

EFFECT OF THE INVENTION

According to the present invention, overshoot and undershoot are detected based on an output voltage, an output current, an output power or an electrical physical quantity (in the present invention, it is specific at least one of resistance, capacitance, inductance or the impedance). And, overshoot inhibited quantity or undershoot inhibited quantity can be generated based on an electrical physical quantity derived from an output voltage, an output current, an output power or these. According to the present invention, if overshoot occurs, for example, it can inhibit overshoot within a short time by including timewise decrement inhibited quantity in overshoot inhibited quantity. The timewise decrement inhibited quantity is defined to each overshoot in period when the overshoot occurs. Therefore according to the present invention, transient and routine response is improved even when load is changed.

CONFIGURATION TO CARRY OUT INVENTION

Figure 1:
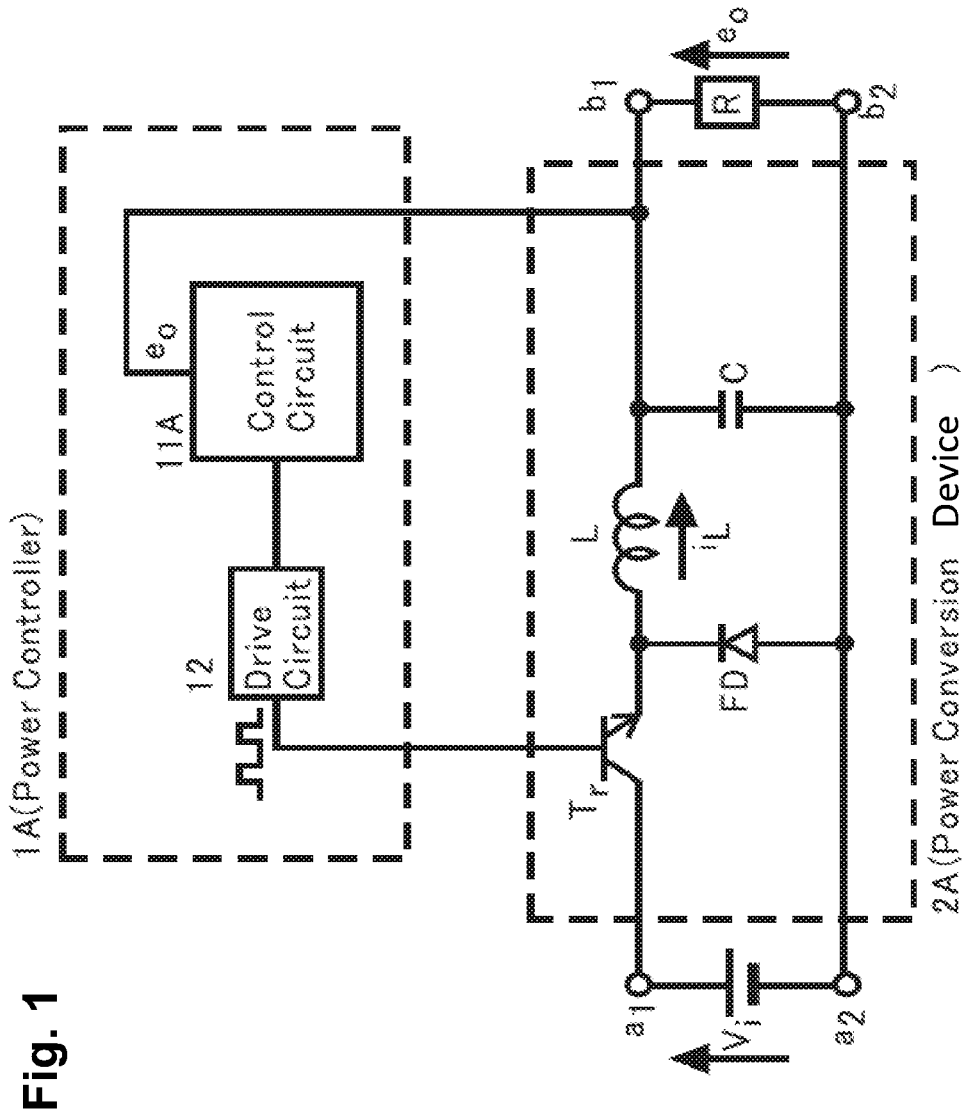
FIG. 1 is an illustration which shows one embodiment of a power controller of the present invention.

FIG. 1 is an illustration which shows an embodiment of a control circuit for inhibiting overshoot and undershoot in a power conversion device of the present invention. A power conversion device (2A) is connected to a control circuit (11A), and the control circuit (11A) is connected to a drive circuit (12). The control circuit (11A) and the drive circuit (12) comprise a power controller (1A).

In FIG. 1, the power conversion device (2A) consists of a transistor switch ($T_r$) where one end was connected to in an the input terminal ($a_1$), a flywheel diode (FD) (a cathode is connected to another end of the transistor switch ($T_r$)) connected between another end of the transistor switch ($T_r$) and an input terminal ($a_2$) (gland), an electric reactor (L) where one end is connected to another end of the transistor switch ($T_r$), and another end is connected to an output terminal ($b_1$) and a capacitor (C) which was connected between the output terminals ($b_1$, $b_2$).

DC power supply is connected between the input terminals ($a_1$, $a_2$), and converted voltage appears between the output terminals ($b_1$, $b_2$). The DC voltage is shown in FIG. 1 by input voltage ($V_i$), and load (R) between the output terminals ($b_1$, $b_2$) is shown by direct current resistance of convenience. Note that, in FIG. 1, voltage (voltage of load R) between the output terminal ($b_1$, $b_2$) is represented in output voltage ($e_o$) (quantity of response). Also, in FIG. 1, the control circuit (11A) acquires output voltage ($e_o$).

Figure 2:
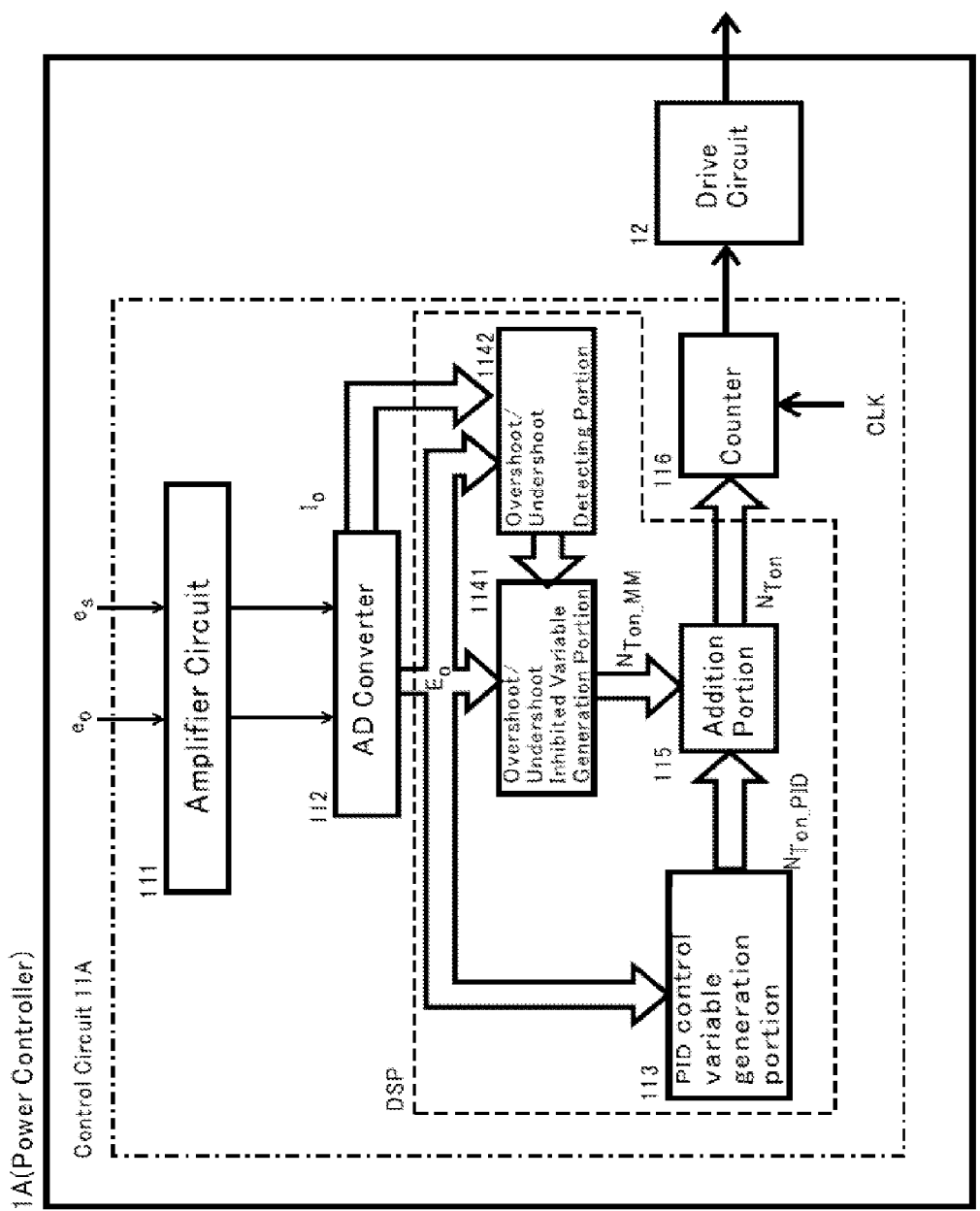
FIG. 2 is a functional block diagram which shows the power controller of FIG. 1.

FIG. 2 is a functional block diagram showing the power controller (1A) (the control circuit (11A) and the drive circuit (12)). In the present specification, a example that control circuits (11A, 11B, 11C, 11D) are comprised of digital circuit are shown as follows. A part or all of control circuit can be constructed by analog circuit. In FIG. 2, the control circuit (11A) consists of an amplifier circuit (111), an AD converter (112), a PID control variable generation portion (113) (a feedback control portion in the present invention), an overshoot/undershoot inhibited variable generation portion (1141), an overshoot/undershoot detecting portion (1142), an addition portion (115), a counter (116). The PID control variable generation portion (113), the overshoot/undershoot inhibited variable generation portion (1141), the overshoot/undershoot detecting portion (1142), and the addition portion (115) can be constructed by DSP (Digital Signal Processor).

In this embodiment, the PID control variable generation portion (113) functions as a feedback control element generation portion, and the PID control variable generation portion (113) generates PID control quantity ($N_{Ton\_PID}$) from digital values ($E_o$) of output voltage ($e_o$).

On the other hand, the overshoot/undershoot detecting portion (1142) detects overshoot or undershoot from output current ($I_o$) and output voltage ($E_o$). Io is digital value of ($i_o$), it is digital value of converted voltage ($e_s$) too. When the overshoot/undershoot detecting portion (1142) detects overshoot or undershoot, the overshoot/undershoot inhibited variable generation portion (1141) calculates ON-time ($T_{on\_MM,n}$) of electric switch ($T_r$) based on input voltage rated value ($E^*_i$), output voltage rated value ($E^*_o$) and output voltage variation ($\Delta E_o$).

$$T_{onMM,n} = (T_s/E^*_i)(E^*_o + \alpha_{A,n} \times \Delta E_o) \quad (1A)$$

$$\alpha_{A,n} = k_{A,n} \times \exp(-\lambda_{A,n} \times n \times T_{samp}) \quad (1B)$$

$\alpha_{A,n}$: timewise decrement inhibited variable
$T_s$: ON-OFF period
$T_{samp}$: sampling period
$E^*_i$: input voltage rated value
$E^*_o$: output voltage rated value
$\Delta E_o$: variation of output voltage
$k_{A,n}$: constant to be fixed by n (it may be the constant that does not depend on n, commonly, negative value)
$\lambda_{A,n}$: constant to be fixed by n (it may be the constant that does not depend on n)
n: integer number
$T_{samp}$: sampling period Output voltage rated value ($E^*_o$) can be changed depending on input voltage ($E_i$), which is a digital value of the input voltage ($V_i$), and output current ($I_o$). In this case, the control circuit (11A) acquires the input voltage ($E_i$) and the output current ($I_o$) other than output voltage ($E_o$), and a table to determine output voltage rated value ($E^*_o$) depending on values of the input voltage ($E_i$) and the output current Io is prepared. Output voltage rated value ($E^*_o$) is determined by this table. ON-time ($T_{on\_MM,n}$) is equivalent to the multiplied value of a period of the predetermined clock (CLK) and overshoot control quantity ($N_{Ton\_MM,n}$).

An addition portion (115) adds PID control quantity ($N_{Ton\_PID,n}$) which is output of the PID control variable generator (113) and overshoot control quantity ($N_{Ton\_MM,n}$) which is output of the overshoot/undershoot inhibited variable generation portion (1141). The addition portion (115) outputs an addition result to the counter (116) as control quantity $N_{Ton,n}$ ($N_{Ton,n} = N_{Ton\_MM,n} + N_{Ton\_PID,n}$). Note that ON-time ($T_{on,n}$) of the transistor switch (Tr) is equivalent to the multiplied value of the period of the predetermined clock (CLK) and control quantity ($N_{Ton,n}$).

The counter (116) pre-sets the value ($N_{Ton,n}$) and outputs carry signal to the drive circuit (12) when a number of the predetermined clock CLK reached the value ($N_{Ton,n}$). The drive circuit (12) turns on the transistor switch ($T_r$) in ON-OFF period ($T_s$). And the drive circuit (12) turns off the transistor switch ($T_r$) when it receives carry signal from the counter (116).

Figure 3:
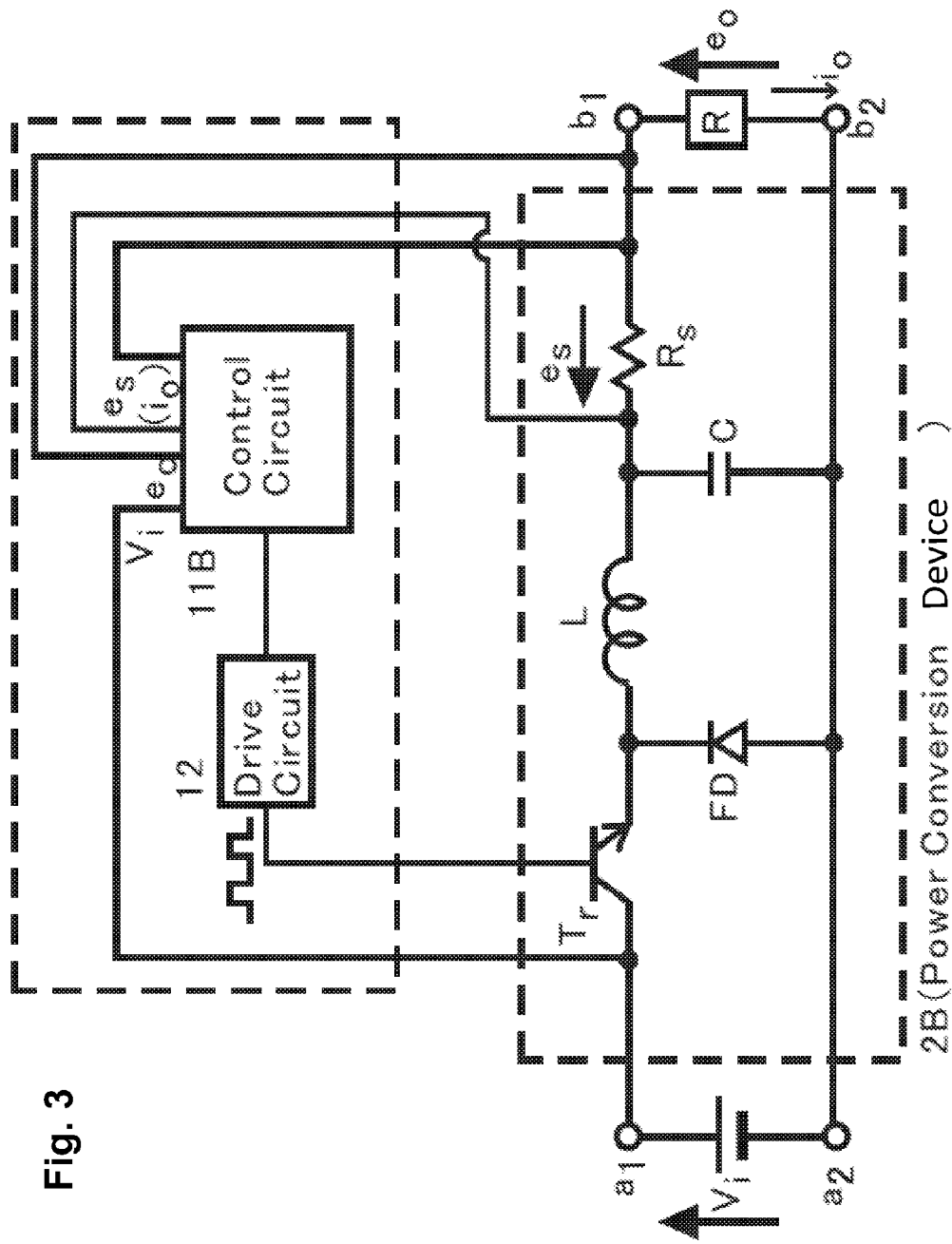
FIG. 3 is an illustration which shows another embodiment of a power controller of the present invention.

At the control circuit (11A) shown in FIGS. 1 and 2, ON-time ($T_{on\_MM,n}$) of the transistor switch ($T_r$) was calculated based on variation of output voltage ($\Delta E_o$), that is, overshoot control quantity ($N_{Ton\_MM,n}$) was calculated. In the embodiment of FIG. 3, overshoot control quantity ($N_{Ton\_MM,n}$) can be calculated based on input voltage ($E_i$), output current ($I_o$) and variation of output current ($\Delta I_o$). In the embodiment of FIG. 3, the control circuit (11B) is connected to a power conversion device (2B), and the control circuit (11B) is connected to the drive circuit (12). The control circuit (11B) and the drive circuit (12) comprise the power controller (1B).

The configuration of the power conversion device (2B) of FIG. 3 is almost same as the configuration of the power conversion device (2A) of FIG. 1. However, resistance ($R_s$) for output current detection is connected between a connecting point and the output terminal (b1). The connecting point is a connecting point of the electric reactor (L) and the capacitor (C). Also, in FIG. 3, the control circuit (11B) inputs input voltage ($V_i$), converted voltage ($e_s$) of output current ($i_o$) and output voltage ($e_o$).

Figure 4:
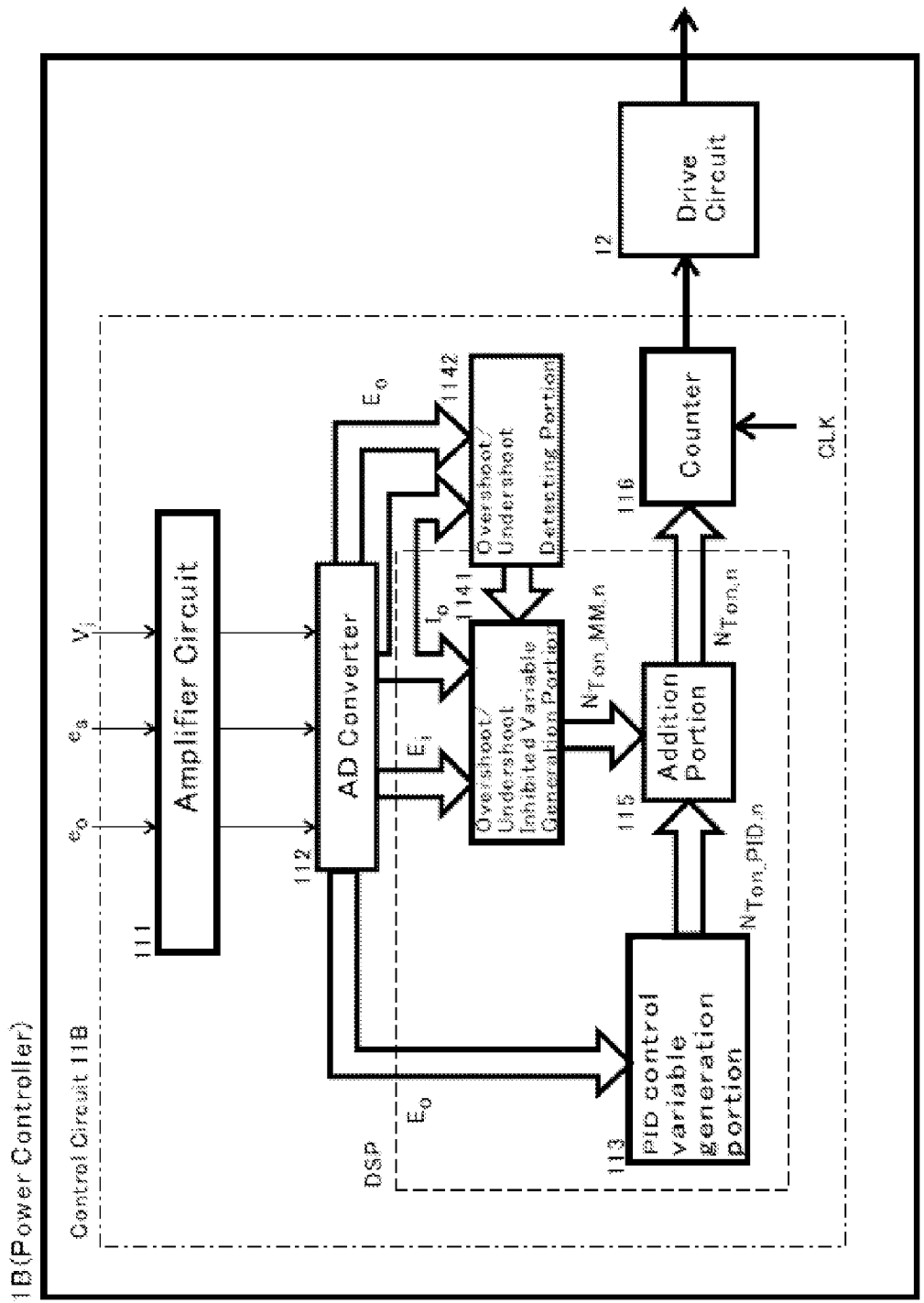
FIG. 4 is a functional block diagram which shows the power controller of FIG. 3.

FIG. 4 is a functional block diagram showing control circuit (11B). The configuration of control circuit (11B) of FIG. 4 is almost same as the configuration of the control circuit (11A) of FIG. 2. However, the amplifier circuit (111) inputs input voltage ($V_i$), converted voltage $e_s$ of output current $i_o$ and output voltage ($e_o$). The AD converter (112) sends digital values ($E_o$) of output voltage ($e_o$) to PID control variable generator (113). Also, the AD converter (112) sends digital value of output current ($i_o$) to overshoot/undershoot detecting portion (1142). Even more particularly, The AD converter (112) sends digital value ($E_i$) of input voltage ($V_i$) and digital values ($I_o$) of converted voltage ($e_s$) of output current ($i_o$) to overshoot/undershoot inhibited variable generation portion (1141). In this embodiment, as shown in next formula ((2A), (2B)), ON-time ($T_{on\_MM,n}$) of electric switch ($T_r$) is calculated based on input voltage ($E_i$), output current ($I_o$) and variation of the output current ($\Delta I_o$).

$$T_{on\_MM,n} = (T_s/E_i)\{E^*_o + r \times (I_o + \alpha_{B,n} \times \Delta I_o)\} \quad (2A)$$

$$\alpha_{B,n} = k_{B,n} \times \exp(-\lambda_{B,n} \times n \times T_{samp}) \quad (2B)$$

$\alpha_{B,n}$: timewise decrement inhibited variable
$T_s$: ON-OFF period
$T_{samp}$: sampling period
$E_i$: input voltage
$E^*_o$: output voltage rated value
$I_o$: output current
$\Delta I_o$: variation of the output current
$k_{B,n}$: constant to be fixed by n (it may be the constant that does not depend on n, commonly, negative value).
$\lambda_{B,n}$: constant to be fixed by n (it may be the constant that does not depend on n)
n: integer number The addition portion (115) of FIG. 4 adds PID control quantity ($N_{Ton\_PID,n}$) which is output of the PID control variable generator (113) and overshoot control quantity ($N_{Ton\_MM,n}$) which is output of the overshoot/undershoot inhibited variable generation portion (1141). The addition portion (115) outputs addition value to the counter (116) as control quantity ($N_{Ton,n}$) ($N_{Ton,n} = N_{Ton\_MM,n} + N_{Ton\_PID,n}$).

Figure 5:
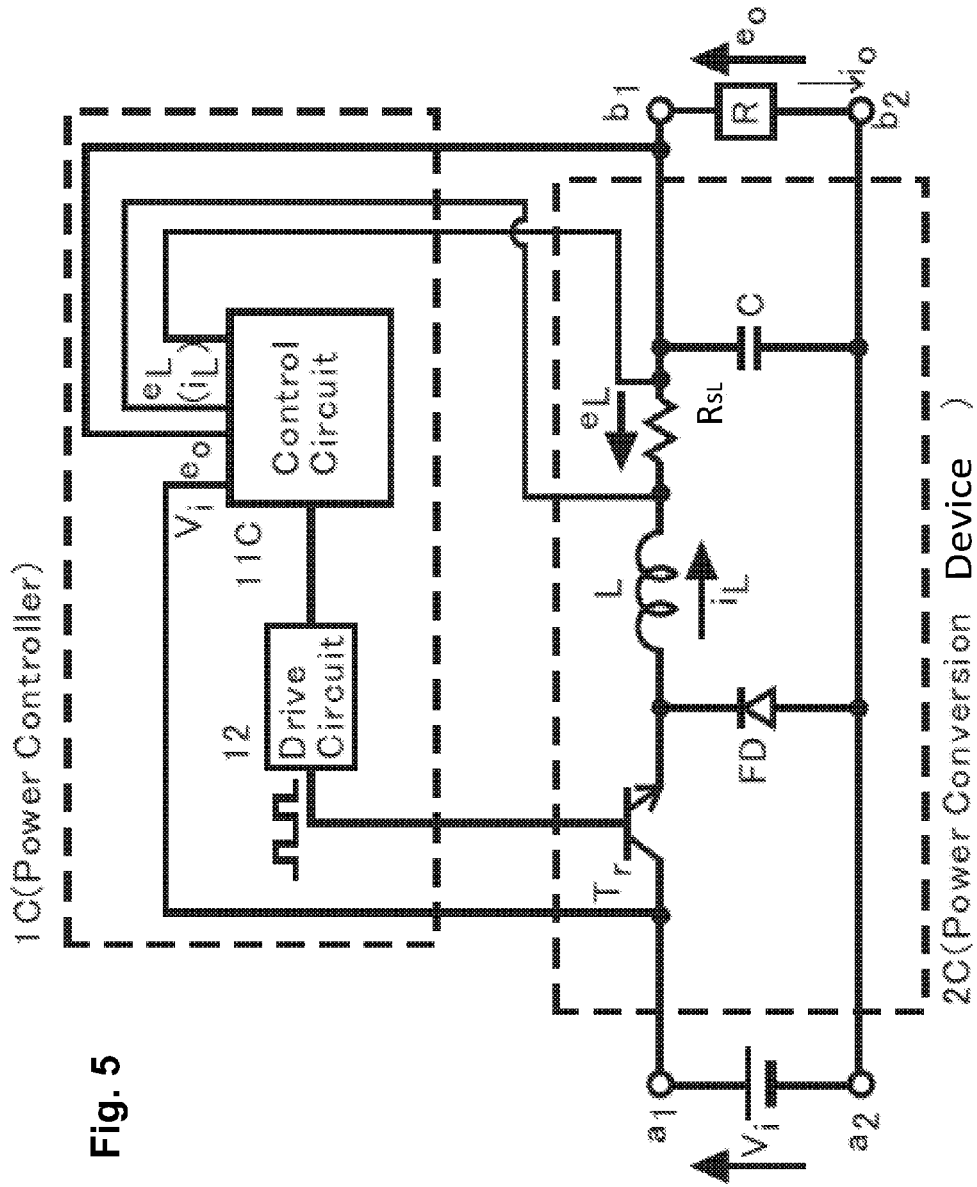
FIG. 5 is an illustration which shows a further other embodiment of a power controller of the present invention.
Figure 6:
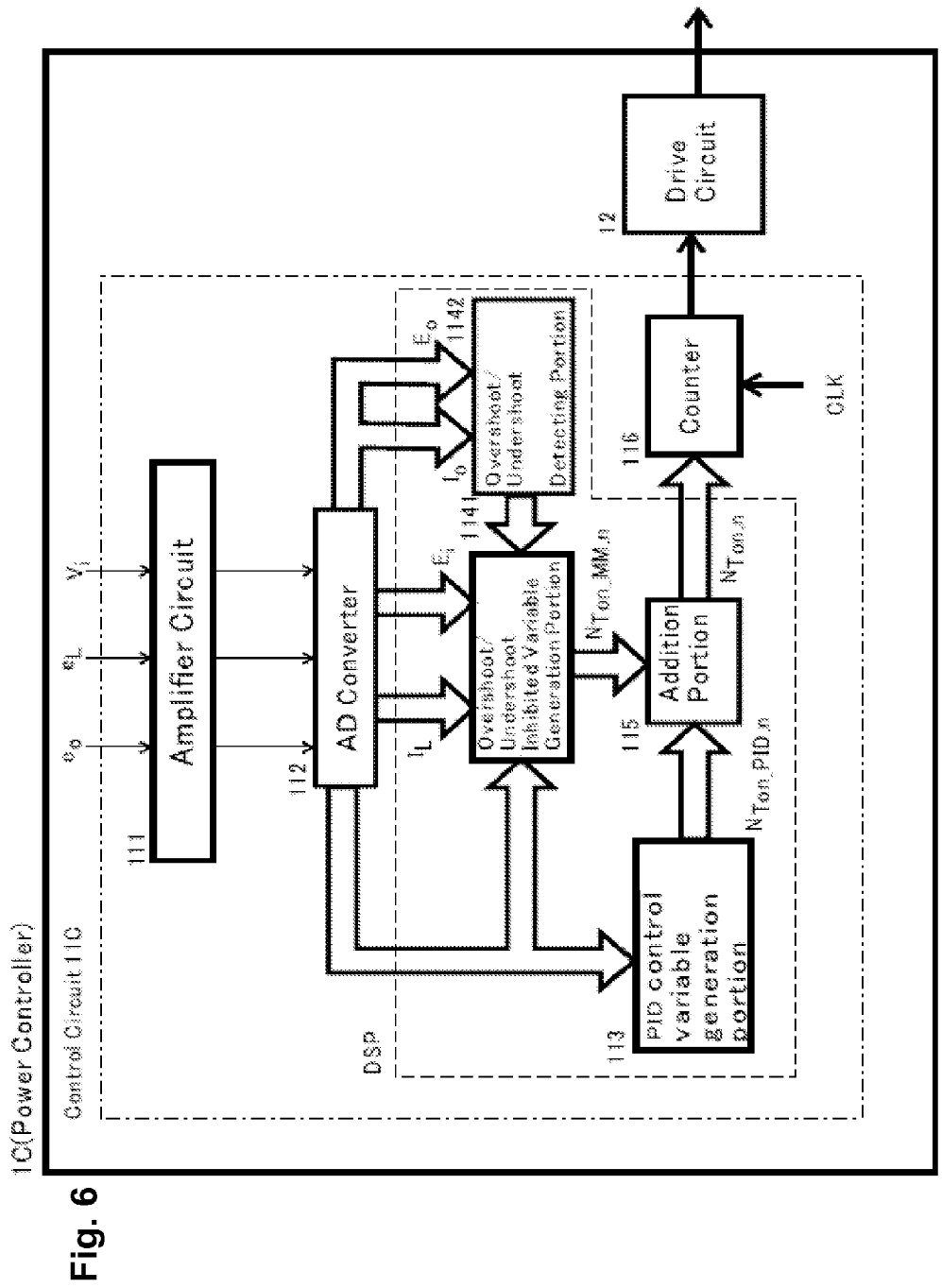
FIG. 6 is a functional block diagram which shows the power controller of FIG. 5.

As noted above, in the embodiment of FIG. 3, the control circuit (11B) performed control based on input voltage ($E_i$), output current ($I_o$) and variation of output current ($\Delta I_o$). As shown in the power conversion device (2C) of FIG. 5 and the control circuit (11C) of FIG. 6, the control circuit (11C) detects electric reactor current ($I_L$) instead of output current ($I_o$). In the embodiment of FIG. 5, the control circuit (11C) is connected to the power conversion device (2C), and the control circuit (11C) is connected to the drive circuit (12). The control circuit (11C) and the drive circuit (12) comprise a power controller (1C).

The configuration of the power conversion device (2C) in FIG. 5 is almost same as the configuration of the power conversion device (2A) of FIG. 1. However, in the present embodiment, resistance ($R_{sL}$) for electric reactor current detection instead of resistance ($R_s$) for output current detection is provided after an electric reactor. Inhibition response of overshoot and undershoot becomes thereby fast.

Note that, in the electric reactor current discontinuous mode, it can use next formula ((3A), (3B)).

$$T_{on\_MM,n} = N_{Ts} \times \{2E^*_o \times L \times (I_L + \alpha_{C,n} \times \Delta I_L)\}^{1/2} \{\times E_i \times (E_i - E^*_o) \times T_s\}^{-1/2} \quad (3A)$$

$$\alpha_{C,n} = k_{C,n} \times \exp(-\lambda_{C,n} \times n \times T_{samp}) \quad (3B)$$

Figure 7:
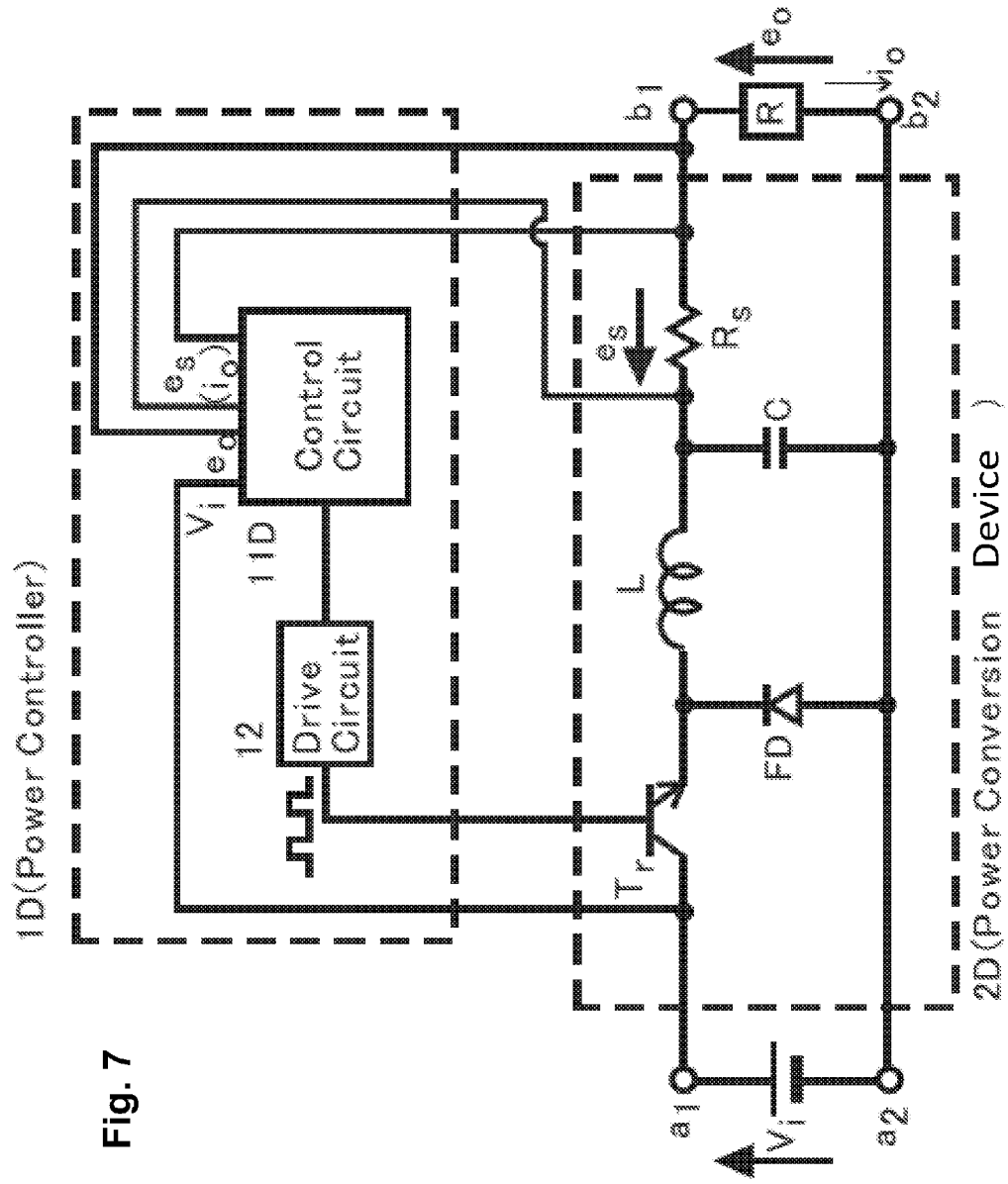
FIG. 7 is an illustration which shows a further other embodiment of a power controller of the present invention.
Figure 8:
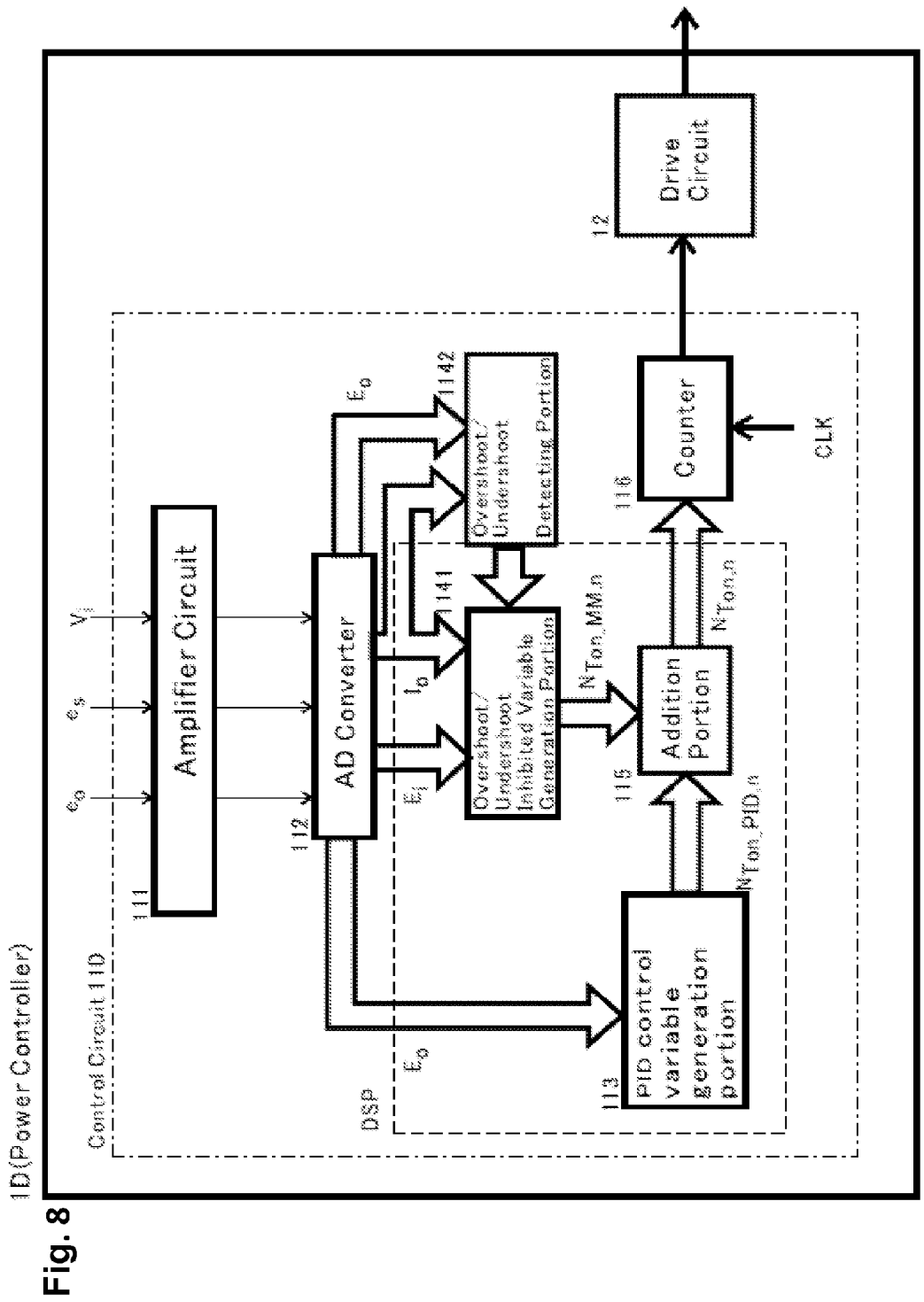
FIG. 8 is a functional block diagram which shows the power controller of FIG. 7.

$\alpha_{C,n}$: timewise decrement inhibit variable.
L: inductance of the electric reactor
$T_s$: ON-OFF period
$T_{samp}$: sampling period
$N_{Ts}$: clock number in ON-OFF period
$E_i$: input voltage
$E^*_o$: output voltage rated value
$I_L$: reactor current $\Delta I_L$: variation of the reactor current
$k_{C,n}$: constant to be fixed by n (it may be the constant that does not depend on n, commonly, negative value)
$\lambda_{C,n}$: constant to be fixed by n (it may be the constant that does not depend on n)
n: integer number As shown in the power conversion device (2D) of FIG. 7 and the control circuit (11D) of FIG. 8, overshoot control quantity ($N_{Ton\_MM,n}$) can be calculated based on input voltage ($E_i$) and output current ($I_o$). In the embodiment of FIG. 7, the control circuit (11D) is connected to the power conversion device (2D), and the control circuit (11D) is connected to the drive circuit (12). The control circuit (11D) and the drive circuit (12) comprise a power controller (1D). In this embodiment, as shown in next formula ((4A), (4B)), ON-time ($T_{on\_MM,n}$) of electric switch ($T_r$) is calculated based on input voltage ($E_i$) and output current ($I_o$).

$$T_{on\_MM,n} = (T_s/E_i)\{E^*_o + r \times I_o \times (1 + \alpha_{D,n})\} \quad (4A)$$

$$\alpha_{D,n} = k_{D,n} \times \exp(-\lambda_{D,n} \times n \times T_{samp}) \quad (4B)$$

Figure 9:
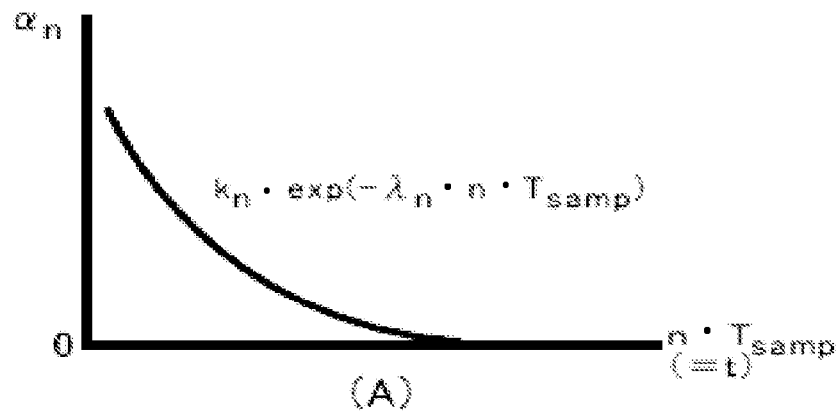
FIG. 9 shows some examples of functions used as timewise decrement inhibited variable, (A) is a figure which shows an exponential function, (B) is a figure which shows a unit function and (C) is a figure which shows a staircase function.
Figure 9:
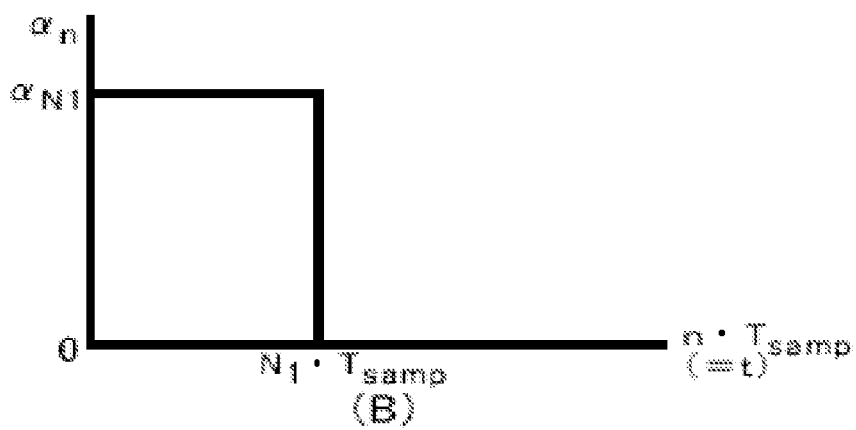
Figure 9:
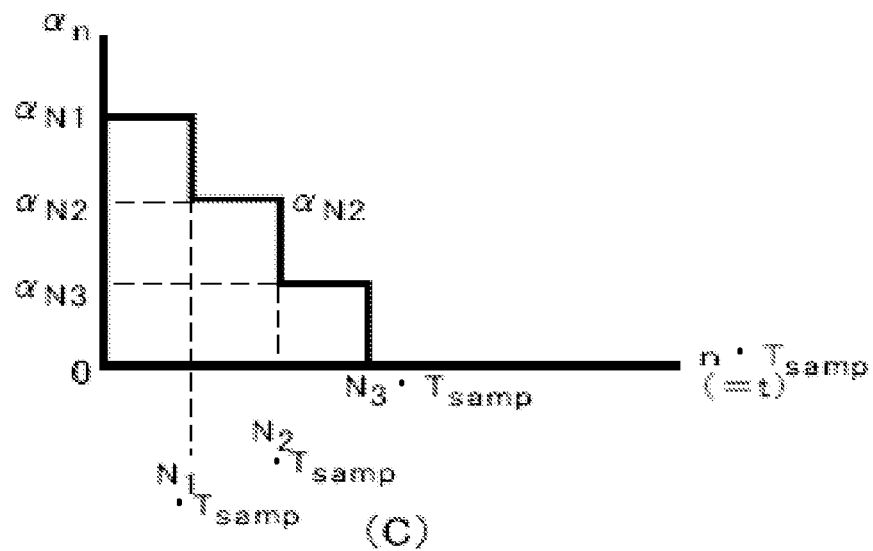

$\alpha_{D,n}$: timewise decrement inhibit variable
$T_s$: ON-OFF period
$T_{samp}$: sampling period
$E_i$: input voltage
$E^*_o$: output voltage rated value
$I_o$: output current
$k_{D,n}$: constant to be fixed by n (it may be the constant that does not depend on n, commonly, negative value)
$\lambda_{D,n}$: constant to be fixed by n (it may be the constant that does not depend on n)
n: integer number An exponential function shown in FIG. 9(A) is used to determine the timewise decrement inhibit variable in each embodiment (formula (1A), (1B), formula (2A), (2B), formula (3A), (3B), formula (4A), (4B)). Horizontal scale is a time axis ($n \times T_s = t$) and vertical scale is timewise decrement inhibit variable axis ($\alpha_n$) in FIG. 9(A). In FIG. 9(A), $\alpha_n$ is represented in $k_n \times \exp(-\lambda_n \times n \times T_{samp})$. As mentioned earlier, n is an integer number showing the order of the sampling. Ts is sampling period, and $k_n$ is constant to be fixed by n, but it may be the constant that it does not depend on n. According to the present invention, a unit function as shown in FIG. 9(B) can be used replacing with exponential function as shown in FIG. 9(A) to determine the timewise decrement inhibit variable. Also, a staircase function as shown in FIG. 9(C) can be used, too. In the unit function of FIG. 9(B) and the staircase function of FIG. 9(C), horizontal scale is time axis ($n \times T_s = t$) and vertical scale is timewise decrement inhibit variable axis ($\alpha_n$). In the unit function of FIG. 9(B), timewise decrement inhibit variable ($\alpha_n$) is "$\alpha_{N1}$" at the time of $0 \leq n \leq M_1 : 0 - N_1 \times T_s$). However, timewise decrement inhibit variable ($\alpha''$) becomes "0" when "n" is beyond "$N_1$". In the staircase function of FIG. 9(C), timewise decrement inhibit variable ($\alpha_n$) is "$\alpha_{N1}$" at the time of $0 \leq n \leq N_1 (0 - N_1 \times T_s)$, "$\alpha_{N2}$" at the time of $N_1 \leq n \leq N_2$ and "$\alpha_{N3}$" at the time of $N_2 \leq n \leq N_3$.

As shown in the figures, the exponential function of FIG. 9(A) and the staircase function of FIG. 9(C) are both monotone decreasing functions whose amplitude damps timewise.

Figure 10:
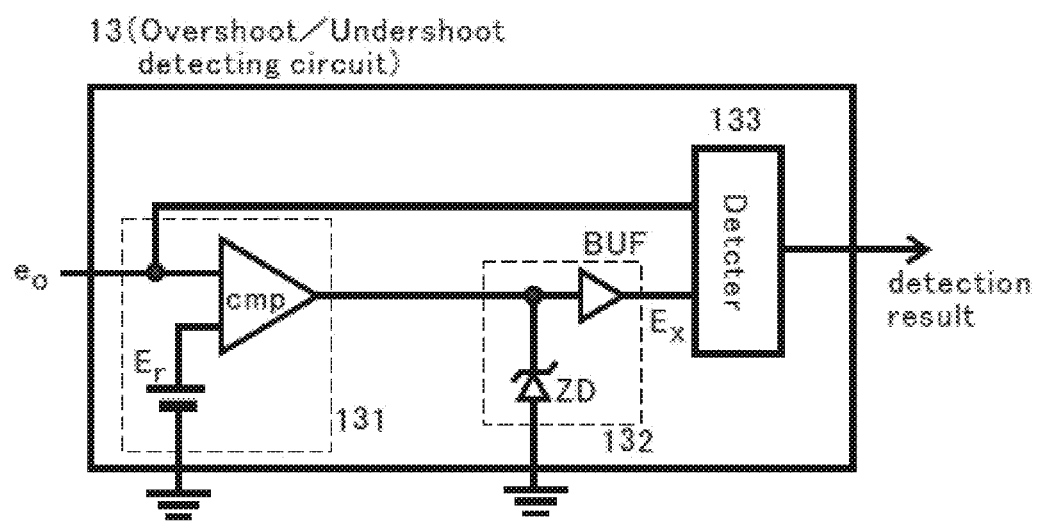
FIG. 10(A) is a figure showing an overshoot/undershoot detecting circuit and FIG. 10(B) is a figure showing an operation of overshoot/undershoot detecting circuit.
Figure 10:
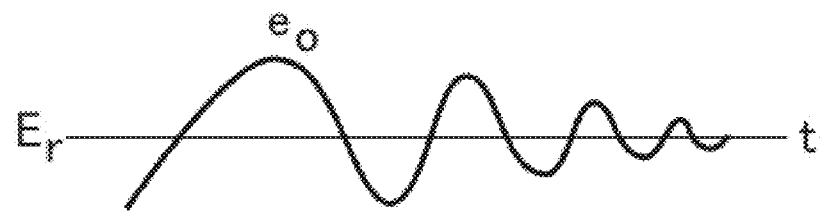
Figure 10:
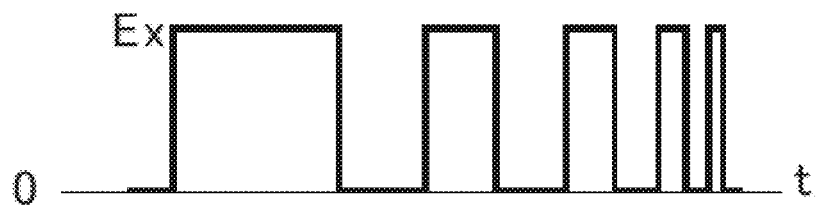

When outbreak timing of overshoot or undershoot is not known beforehand, the overshoot/undershoot detecting circuit (13) as shown in FIG. 10(A) is available.

In FIG. 10(A), an overshoot/undershoot detecting circuit (13) consists of a comparator (cmp) (131) of which reference voltage is DC voltage ($E_r$), a buffer circuit (132) and a detecter (133). The buffer circuit (132) consists of a Zener diode (ZD) of anodal earth and a buffer (BUF). The Zener diode (ZD) is placed between an output terminal of a comparator (131) and ground. The buffering (BUF) is connected between a cathode terminal of the Zener diode (ZD) and an input terminal of the detecter (133). The detecter (133) inputs the output voltage ($e_o$) and the output voltage ($E_x$) of the buffer circuit (132). As shown in FIG. 10(B), outbreaks of overshoot and undershoot are detected by comparing sign of these input signals (output voltage ($e_o$), output voltage ($E_x$)). Also, it is determined whether character of output ($e_o$) is overshoot or undershoot.

Figure 11:
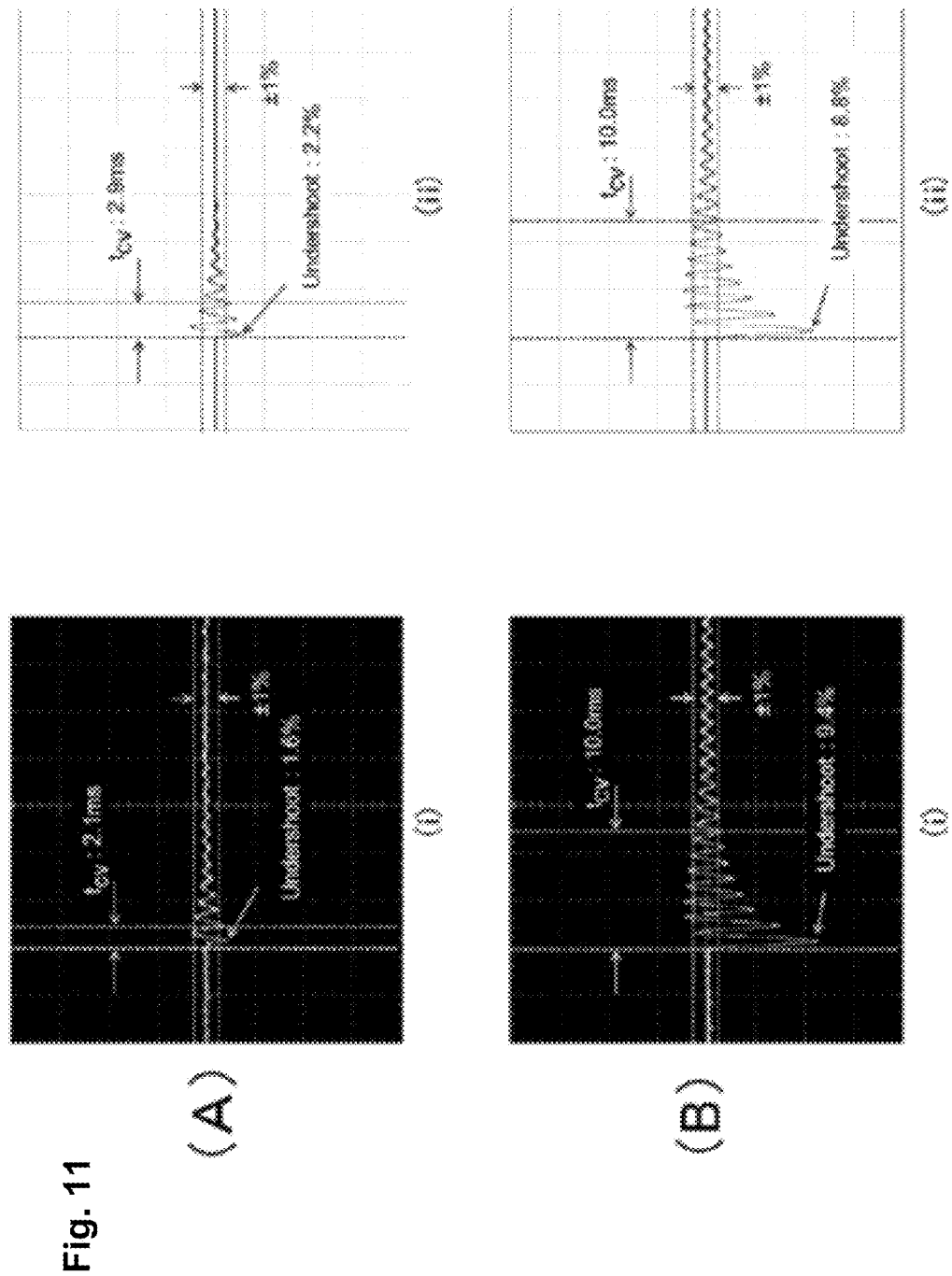
FIG. 11 shows effects by the present invention, (A) is a figure showing a simulation value and an actual value by control of the present invention and (B) is a figure showing a simulation value and an actual value by PID control.

FIG. 11(A), (B) are figures showing the effects by the present invention. FIG. 11(A) (i), (ii) show a simulation value and an actual value by the control of the present invention. FIG. 11(B) (i), (ii) show a simulation value and an actual value by the PID control. According to the present invention, overshoots and undershoots are inhibited within a short time.

In the embodiment, control circuit (11) acquired input voltage ($E_i$), converted voltage ($e_s$) of the output current and output voltage ($e_o$), but the present invention is not limited to those. For example, control circuit (11) can take a plural number among input voltage ($E_i$), converted voltage ($e_s$) of the output current, output voltage ($e_o$), input current ($I_i$), output power ($P_o$), load (R), reactor current ($i_L$), capacitor voltage ($e_c$), capacitor current ($i_c$) and electric switch current ($i_{Tr}$), and the control of the present invention is carried out by these peak value, mean value or effective value.

Parameter ($k_{A,n}$, $\lambda_{A,n}$) of timewise decrement inhibit variable ($\alpha_{A,n}$) in the formula (1B), parameter ($k_{B,n}$, $\lambda_{B,n}$) of timewise decrement inhibit variable ($\alpha_{B,n}$) in the formula (2B), parameter ($k_{C,n}$, $\lambda_{C,n}$) of timewise decrement inhibit variable ($\alpha_{C,n}$) in the formula (3B) and parameter ($k_{D,n}$, $\lambda_{D,n}$) of timewise decrement inhibit variable ($\alpha_{D,n}$) in the formula (4B) are determined based on input voltage ($E_i$), output voltage ($E_o$), output current ($I_o$), electric reactor current ($I_L$), load resistance (load impedance) or electric power ($P_o$). The greatest number of times of sampling represented by n in formula (1B), formula (2B), formula (3B), formula (4B) is determined based on input voltage ($E_i$), output voltage ($E_o$), output current ($I_o$), electric reactor current ($I_L$), load resistance (load impedance) or electric power ($P_o$).

Figure 12:
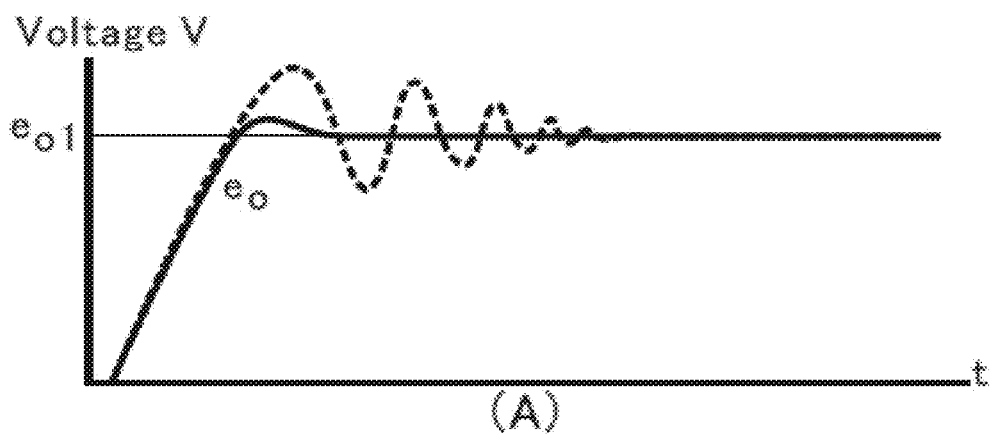
FIG. 12 shows effects by the present invention, (A) and (B) are figures showing that overshoot and undershoot are reduced and (C) is a figure showing that the time of voltage convergence to a predetermined value is shortened.
Figure 12:
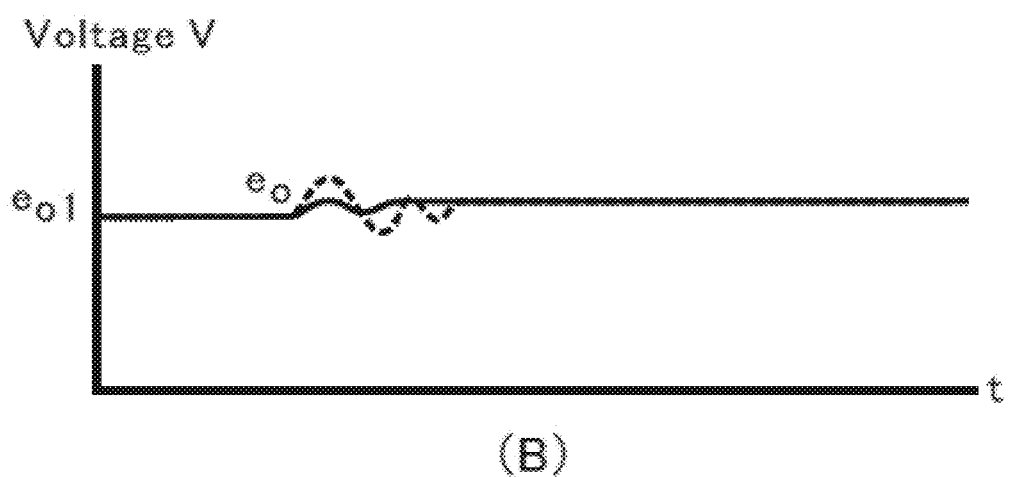
Figure 12:
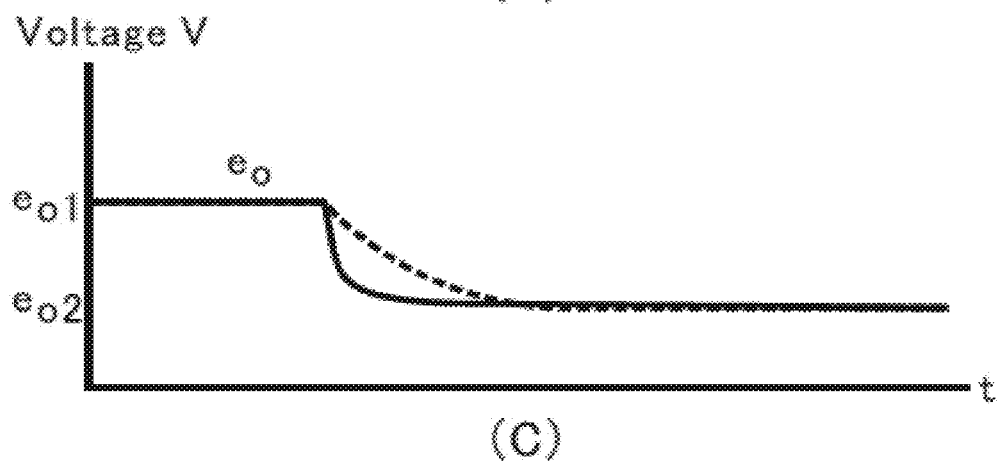
Figure 13:
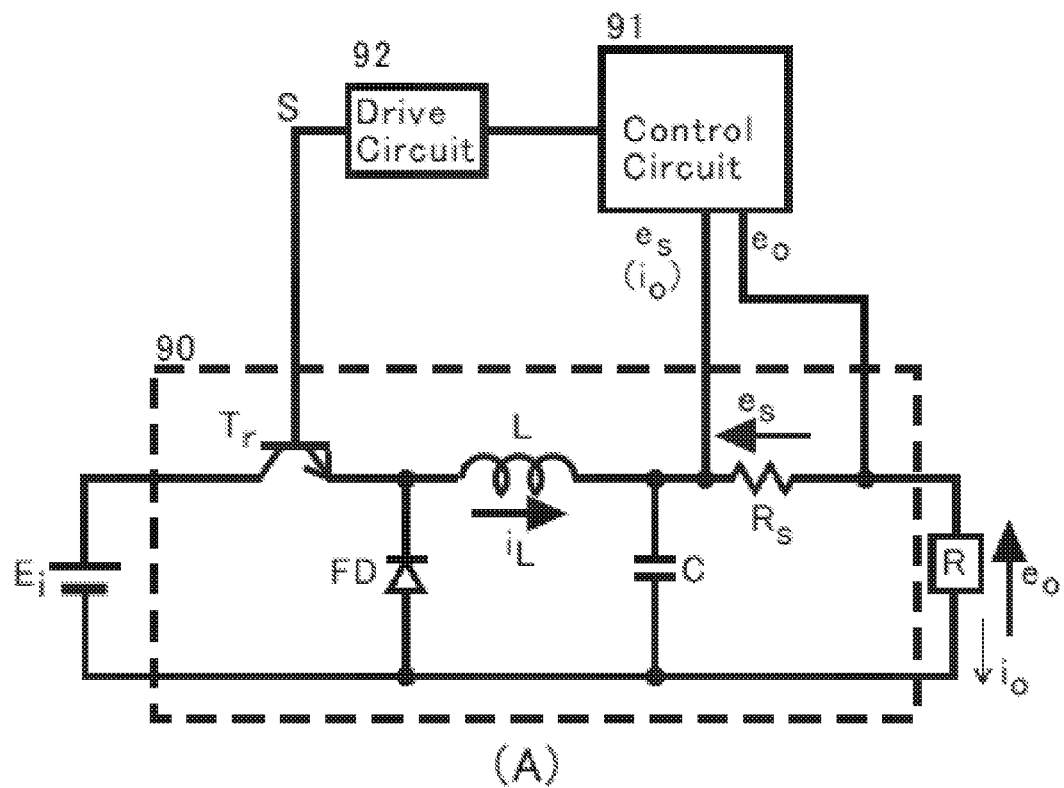
FIG. 13 shows a prior art, (A) is a figure showing switching power supply and (B) is an illustration of ON-OFF control by a transistor switch.
Figure 13:
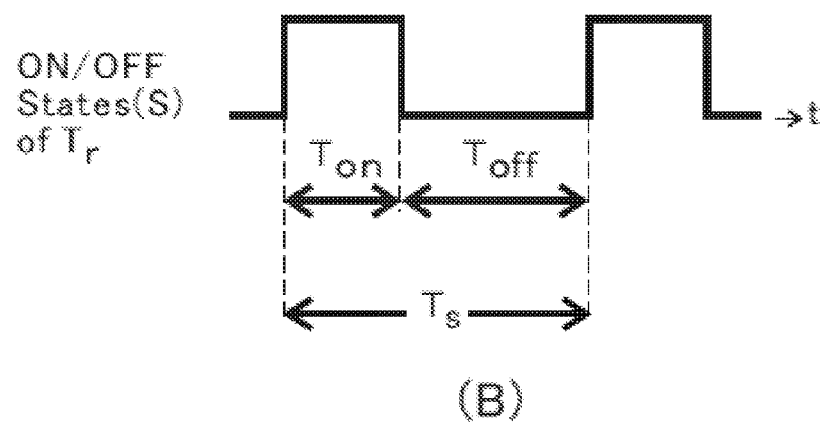
Figure 14:
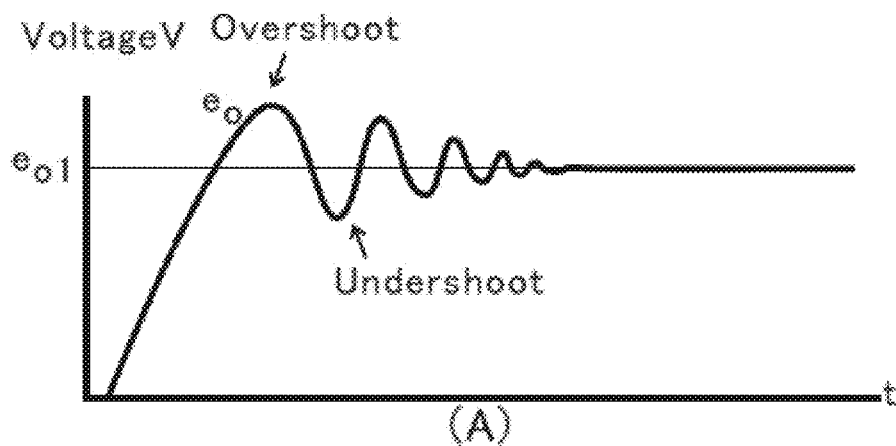
FIGS. 14(A) and (B) are figures showing overshoot and undershoot, and (C) is a figure showing moderate voltage transition.
Figure 14:
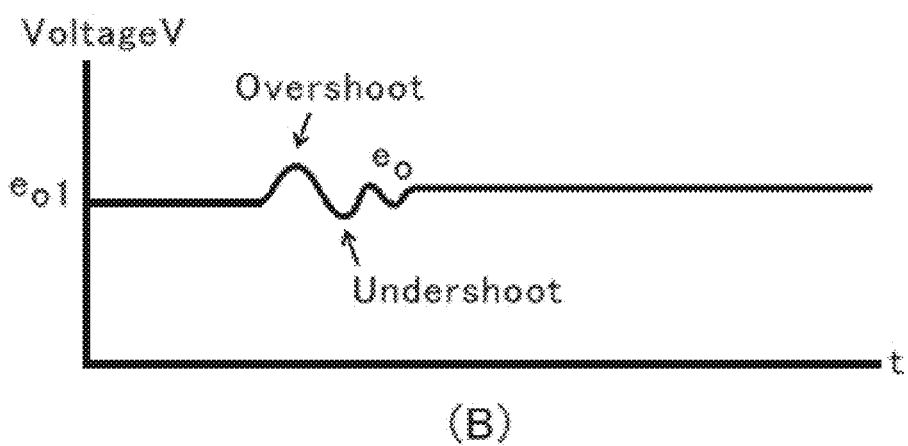
Figure 14:
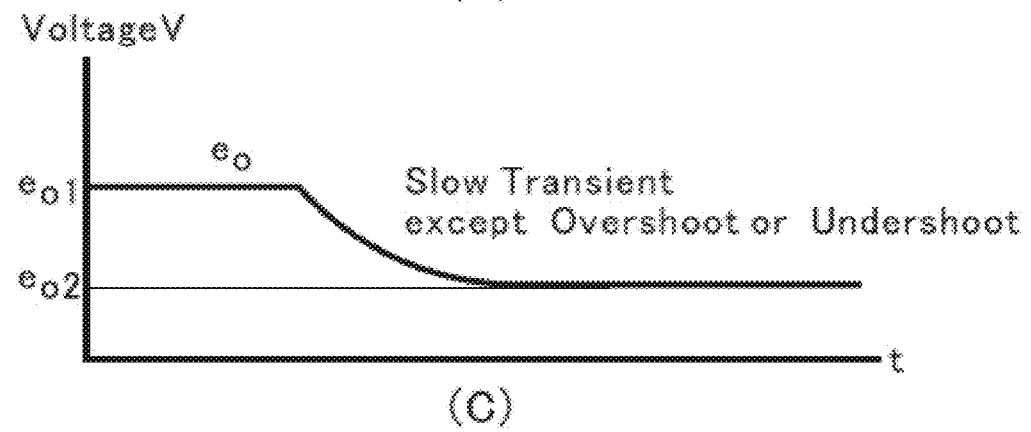

FIG. 12 are figures showing the effects by the present invention. (A) and (B) show that overshoot and undershoot are reduced when large overshoot and undershoot originally occurred by fluctuation. (C) shows that the time of voltage convergence to a predetermined value is shortened.

EXPLANATIONS OF THE LETTERS OF NUMERALS 1A, 1B, 1C, 1D: power controller
2A, 2B, 2C, 2D: power conversion device
11A, 11B, 11C, 11D: control circuit
12: drive circuit
13: overshoot/undershoot detecting circuit
90: switching power supply
91: control circuit
92: drive circuit
111: amplifier circuit
112: AD converter
113: PID control variable generation portion
115: addition portion
116: counter
131: comparator
132: buffer circuit
133: detecter
1141: overshoot/undershoot inhibit variable generation portion
1142: overshoot/undershoot detecting portion
BUF: buffer
C: smoothing capacitor
CLK: reference clock
$E_i$: input voltage
$E_o$: output voltage
$E_r$: DC voltage
FD: flywheel diode
$I_i$: input current (digital values)
Io: output current (digital values)
L: filtering electric reactor
M: integer number to show which over/undershoot it is $N_{Ei}$: digital values of input voltage Ei
$N_{Ton\_PID}$: PID inhibited variable
$N_{Ton\_MM,n}$: overshoot inhibit variable
$N_{Ton}$: the number of the predetermined clock CLK
$N_{eo}$: digital values of the output voltage
$N_{es}$: digital values of the output current
R: load
$R_s$: resistance for output current detection
$T_r$: transistor switch
$T_{samp}$: sampling period
ZD: Zener diode
$a_1$, $a_2$: input terminal output terminal
$b_1$, $b_2$ output terminal
$e_c$: capacitor voltage
$e_o$: output voltage
$e_{ref}$: command
$e_s$: conversion voltage value of the output current
$i_L$: reactor current
$i_{Tr}$: Electric switch current
$i_c$: capacitor current
$i_o$: output current
kA,n, kB,n, kC,n, kD,n: constant (it may be the constant that does not depend on n., commonly, negative value) to be fixed by n
n: integer number to show whether it is the sampling of what joint
$\lambda_{A,n}$, $\lambda_{B,n}$, $\lambda_{C,n}$, $\lambda_{D,n}$: constant (it may be the constant that does not depend on n) to be fixed by n
$\alpha_n$, $\alpha_{A,n}$, $\alpha_{B,n}$, $\alpha_{C,n}$, $\alpha_{D,n}$: timewise decrement inhibit variable
$\Delta E_o$: variation of the output voltage
$\Delta I_o$: variation of the output current

The invention claimed is:

1. A control circuit for inhibiting overshoot and undershoot in a power conversion device comprising:
an overshoot/undershoot detecting portion which detects overshoot or undershoot; and
an overshoot/undershoot inhibited variable generator which generates overshoot inhibited variable or undershoot inhibited variable;
wherein at a time when the overshoot/undershoot detecting portion detects overshoot, the overshoot/undershoot inhibited variable generator generates the overshoot inhibited variable including timewise decrement inhibited variable which works at least in beginning of one overshoot period,
at a time when the overshoot/undershoot detecting portion detects undershoot, the overshoot/undershoot inhibited variable generator generates the undershoot inhibited variable including timewise decrement inhibited variable which works at least in beginning of one undershoot period, and
the timewise decrement inhibited variable is determined by a monotone decreasing function of which amplitude damps timewise.

2. The control circuit for inhibiting overshoot and undershoot in the power conversion device according to claim 1, wherein
the overshoot inhibited variable includes the timewise decrement inhibited variable only in a first overshoot, or only in overshoots and undershoots of earlier M times, wherein M is an integer number larger than 2, or
the undershoot inhibited variable includes the timewise decrement inhibited variable only in a first undershoot, or only in undershoots and overshoots of earlier M times, wherein M is an integer number larger than 2.

3. The control circuit for inhibiting overshoot and undershoot in the power conversion device according to claim 1 which performs feedback control of output of the power conversion device, wherein said control circuit comprises:
a feedback circuit which generates a feedback control signal so that output nears reference value; and
a control signal addition portion which outputs addition control signal which is a sum of the feedback control signal and the overshoot inhibited variable or the undershoot inhibited variable.

4. The control circuit for inhibiting overshoot and undershoot in the power conversion device according to claim 3, which regulates ON-time of a power switch of the power conversion device, wherein
$T_{ON,n}$, which is the ON-time of the power switch, is a sum of a time based on the feedback control signal and a time based on the overshoot inhibited variable or the undershoot inhibited variable, $$T_{ON,n}=T_{FB,n}+T_{OU,n}$$

$T_{ON,n}$: ON-time of the power switch
$T_{FB,n}$: time based on the feedback control signal
$T_{OU,n}$: time based on overshoot inhibited variable or undershoot inhibited variable $$T_{OU,n}=T_{BIAS}+kc2\cdot\Delta io\cdot\exp(-kc1\cdot n)+kv2\cdot\Delta eo\cdot\exp(-kv1\cdot n)$$

$T_{BIAS}$: fixed time
$\Delta io$: variation of output current
$\Delta eo$: variation of output voltage
$k_{c1}$, $k_{c2}$, $k_{v1}$, $k_{v2}$: constant
n: numeric value of sampling number.

5. The control circuit for inhibiting overshoot and undershoot in the power conversion device according to claim 1, which generates a control signal of a power switch of the power conversion device, wherein the overshoot/undershoot inhibited variable generator generates the overshoot inhibited variable or the undershoot inhibited variable by attenuating switch-ON-time value or switch-OFF-time value of the control signal with passage of sampling time.

6. The control circuit for inhibiting overshoot and undershoot in the power conversion device according to claim 1, wherein input of the control circuit is an output voltage, an output current, or an output power.

7. The control circuit for inhibiting overshoot and undershoot in the power conversion device according to claim 1, wherein the overshoot inhibited variable or the undershoot inhibited variable is generated from at least one among an input voltage, an output voltage, an output current, an output power, a current flowing through a power switch, a current flowing through a reactor provided in an output side of power conversion device, and a current flowing through a capacitor provided in the output side of power conversion device.

8. The control circuit for inhibiting overshoot and undershoot in the power conversion device according to claim 1, wherein the monotone decreasing function of which amplitude damps timewise is an exponential function or a staircase function.

9. A control method for inhibiting overshoot and undershoot in a power conversion device comprising:
detecting overshoot or undershoot; and
generating overshoot inhibited variable or undershoot inhibited variable;
wherein at time when detecting overshoot, generating the overshoot inhibited variable including timewise decrement inhibited variable which works at least in beginning of one overshoot period, at a time when detecting undershoot, generating the undershoot inhibited variable including timewise decrement inhibited variable which works at least in beginning of one undershoot period, and the timewise decrement inhibited variable is determined by a monotone decreasing function of which amplitude damps timewise.

10. The control method for inhibiting overshoot and undershoot in the power conversion device according to claim 9, wherein the overshoot inhibited variable includes the timewise decrement inhibited variable only in a first overshoot, or only in overshoots and undershoots of earlier M times, wherein M is an integer number larger than 2, or the undershoot inhibited variable includes timewise decrement inhibited variable only in a first undershoot, or only in undershoots and overshoots of earlier M times, wherein M is an integer number larger than 2.

11. The control method for inhibiting overshoot and undershoot in the power conversion device according to claim 9, wherein the overshoot inhibited variable or the undershoot inhibited variable is generated from at least one among an input voltage, an output voltage, an output current, an output power, a current flowing through a power switch, a current flowing through a reactor provided in an output side of the power conversion device, and a current flowing through a capacitor provided in the output side of the power conversion device.

12. The control method for inhibiting overshoot and undershoot in the power conversion device according to claim 9, wherein the monotone decreasing function of which amplitude damps timewise is an exponential function or a staircase function.

* * * * *